(12) United States Patent
Matsueda et al.

(10) Patent No.: US 7,267,205 B2
(45) Date of Patent: Sep. 11, 2007

(54) APPARATUS FOR ACTUATING A BICYCLE HUB BRAKE

(75) Inventors: Keiji Matsueda, Sakai (JP); Keita Tanaka, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 127 days.

(21) Appl. No.: 11/162,206

(22) Filed: Aug. 31, 2005

(65) Prior Publication Data

US 2007/0051567 A1 Mar. 8, 2007

(51) Int. Cl.
*B62L 5/00* (2006.01)
(52) U.S. Cl. ................. 188/26; 188/17; 188/24.22; 188/2 D
(58) Field of Classification Search ........... 188/2 D, 188/17, 19, 22, 24.11, 24.14, 24.16, 24.22, 188/25, 26, 2 F
See application file for complete search history.

(56) References Cited

U.S. PATENT DOCUMENTS

| | | | | |
|---|---|---|---|---|
| 5,682,963 | A * | 11/1997 | Tang | 188/24.22 |
| 5,842,659 | A * | 12/1998 | Ligon et al. | 242/394.1 |
| 6,193,022 | B1 * | 2/2001 | Bode | 188/2 D |
| 6,491,137 | B2 * | 12/2002 | Lumpkin et al. | 188/24.15 |
| 6,520,297 | B1 * | 2/2003 | Lumpkin et al. | 188/26 |
| 6,607,057 | B2 * | 8/2003 | Lumpkin et al. | 188/26 |
| 6,793,045 | B2 | 9/2004 | Matsueda | 188/26 |
| 6,837,341 | B2 | 1/2005 | Matsueda | 188/24.22 |
| 6,860,570 | B2 * | 3/2005 | Yanaka et al. | 303/20 |
| 6,863,162 | B1 * | 3/2005 | Gabas | 188/2 D |
| 6,907,959 | B2 * | 6/2005 | Wang | 188/2 D |
| 6,957,596 | B2 * | 10/2005 | Kopetzky et al. | 74/501.5 R |
| 6,968,927 | B2 * | 11/2005 | Scura | 188/24.16 |
| 2003/0070885 | A1 * | 4/2003 | Tachiiri et al. | 188/2 D |
| 2003/0090150 | A1 * | 5/2003 | Woo | 303/191 |
| 2003/0226723 | A1 * | 12/2003 | Matsueda | 188/26 |
| 2004/0163896 | A1 * | 8/2004 | Wang | 188/2 D |
| 2007/0045054 | A1 * | 3/2007 | Matsueda et al. | 188/2 D |

* cited by examiner

*Primary Examiner*—Xuan Lan Nguyen
(74) *Attorney, Agent, or Firm*—James A. Deland

(57) ABSTRACT

An apparatus is provided for actuating a bicycle hub brake of the type having a fastening bracket adapted to be nonrotatably mounted relative to a bicycle frame, a brake drum, and a brake mechanism adapted to apply a braking force to the brake drum, wherein the brake drum rotates integrally with a bicycle hub around a hub axle. The apparatus comprises an actuating member and a rotating member. The actuating member is structured to be movably mounted relative to the fastening bracket for actuating the brake mechanism, and the rotating member is structured to be rotatably mounted relative to the fastening bracket independently of the actuating member. The rotating member includes an actuating member moving unit for moving the actuating member. The rotating member also includes a cable winding surface to wind a brake actuating cable thereon.

19 Claims, 17 Drawing Sheets

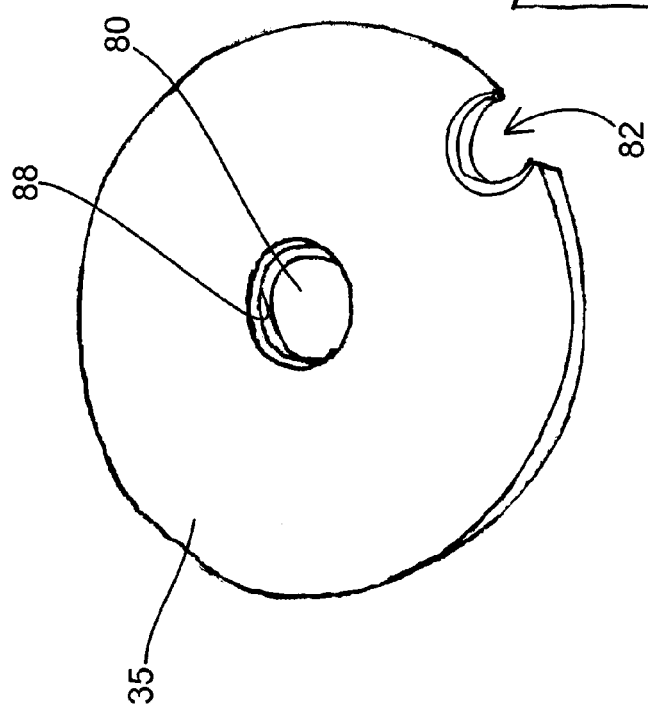
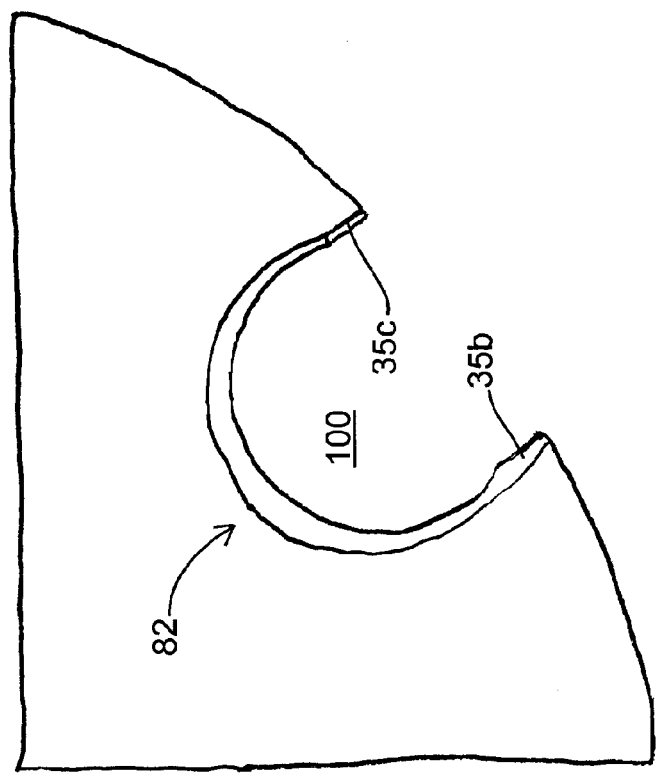

APPARATUS FOR ACTUATING A BICYCLE HUB BRAKE

BACKGROUND OF THE INVENTION

The present invention is directed to bicycle brake devices and, more particularly, to bicycle brake devices that are used to brake a hub of a bicycle wheel.

Bicycle braking devices currently available include rim braking devices and hub braking devices. Rim braking devices include cantilever brakes or caliper brakes that brake the rim of the wheel. Hub braking devices brake the wheel hub, and they include drum brakes, band brakes, roller brakes and the like. A hub brake brakes the hub of the wheel, so it is able to provide braking even if the wheel rim is warped.

A drum brake such as a roller brake effects braking by means of friction created when a brake shoe contacts the inside peripheral face of a tubular brake drum that rotates in unison with the wheel hub. A band brake effects braking by means of friction created when a brake belt contacts the outer peripheral face of a brake drum. In a roller brake, rollers spaced apart in the circumferential direction are displaced diametrically outward by a cam in order to move a brake shoe against the inner peripheral face of the brake drum.

In brake devices of this kind, there is provided a brake actuator having an actuating arm for moving the brake shoe or brake band into contact with the brake drum, wherein the basal end of the brake arm is rotatably mounted to a fastening bracket. The inner cable of a Bowden brake cable is attached to the distal end of the actuating arm so that pulling and releasing the inner cable relative to the outer cable of the Bowden cable rotates the actuating arm. The outer cable of the Bowden cable usually is attached to the bicycle frame or to the fastening bracket.

The basal portion of the actuating arm typically is housed within a casing formed by the fastening bracket and a hub cap that attaches to the fastening bracket. The actuating arm extends through a slot formed in a side surface of the casing, and the inner cable of the Bowden cable is attached to the distal end of the actuating arm. Unfortunately, the extending portion of the actuating arm forms a projection that can snag on obstacles encountered while riding the bicycle. Furthermore, the inner cable of the Bowden cable usually is attached to the actuating arm using a nut and bolt assembly such that the nut and bolt must be disassembled whenever the cable is to be removed from the actuating arm. Not only does this increases the labor required to remove the bicycle wheel, but the brakes must be readjusted every time the inner cable is reattached.

SUMMARY OF THE INVENTION

The present invention is directed to inventive features of a bicycle braking device. In one embodiment, an apparatus is provided for actuating a bicycle hub brake of the type having a fastening bracket adapted to be nonrotatably mounted relative to a bicycle frame, a brake drum, and a brake mechanism adapted to apply a braking force to the brake drum, wherein the brake drum rotates integrally with a bicycle hub around a hub axle. The apparatus comprises an actuating member and a rotating member. The actuating member is structured to be movably mounted relative to the fastening bracket for actuating the brake mechanism, and the rotating member is structured to be rotatably mounted relative to the fastening bracket independently of the actuating member. The rotating member includes an actuating member moving unit for moving the actuating member.

In another embodiment, an apparatus is provided for actuating a bicycle hub brake, wherein the bicycle hub brake includes a brake drum and a brake mechanism adapted to apply a braking force to the brake drum, wherein the brake drum rotates integrally with a bicycle hub around a hub axle. The apparatus comprises a fastening bracket adapted to be nonrotatably mounted relative to a bicycle frame and having an opening dimensioned to receive a hub axle therethrough, an actuating member structured to be movably mounted relative to the fastening bracket for actuating the brake mechanism, and a rotating member structured to be rotatably mounted relative to the fastening bracket, wherein the rotating member has an opening dimensioned to receive the hub axle therethrough. The rotating member includes an actuating member moving unit for moving the actuating member. The rotating member also includes a cable winding surface to wind a brake actuating cable thereon.

Additional inventive features will become apparent from the description below, and such features alone or in combination with the above features may form the basis of further inventions as recited in the claims and their equivalents.

BRIEF DESCRIPTION OF THE DRAWINGS

FIG. 10 is an oblique outer view of the cover member;

FIG. 12 is a more detailed view of a brake control element mount;

DETAILED DESCRIPTION OF THE EMBODIMENTS

Figure 1:
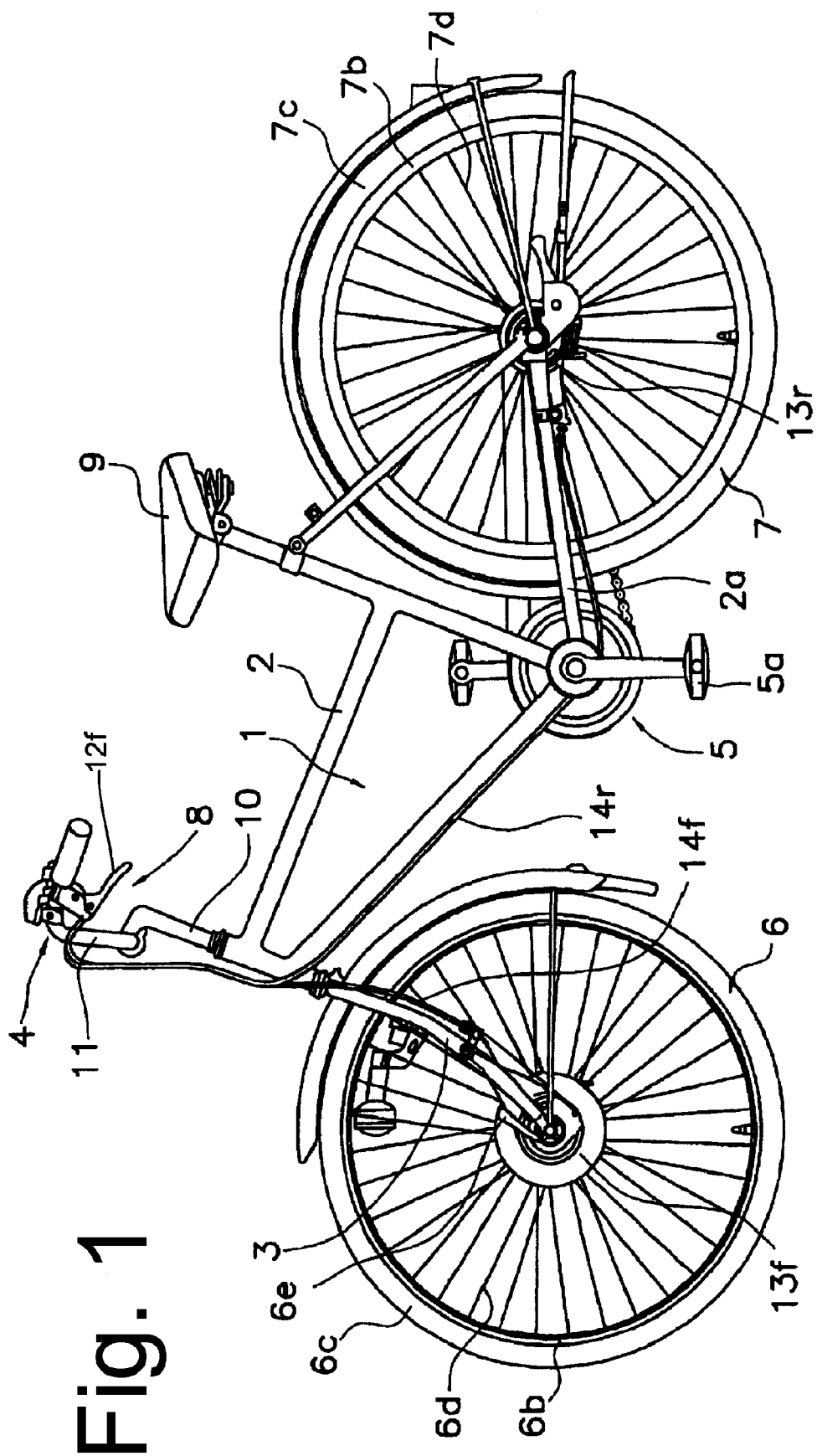
FIG. 1 is a side view of a particular embodiment of a bicycle that includes braking components described herein.

FIG. 1 is a side view of a particular embodiment of a bicycle 1 that includes braking components described herein. In this embodiment, bicycle 1 comprises a frame body 2 and a front fork 3; a handlebar portion 4 comprising a handle stem 10 fastened to the top of front fork 3 and a handlebar 11 fastened to handle stem 10 for steering; a saddle 9 for sitting; a front wheel 6; a rear wheel 7; a brake system 8 for braking front wheel 6 and rear wheel 7; and a drive section 5 for transmitting rotation of pedals 5a to rear wheel 7.

Figure 4:
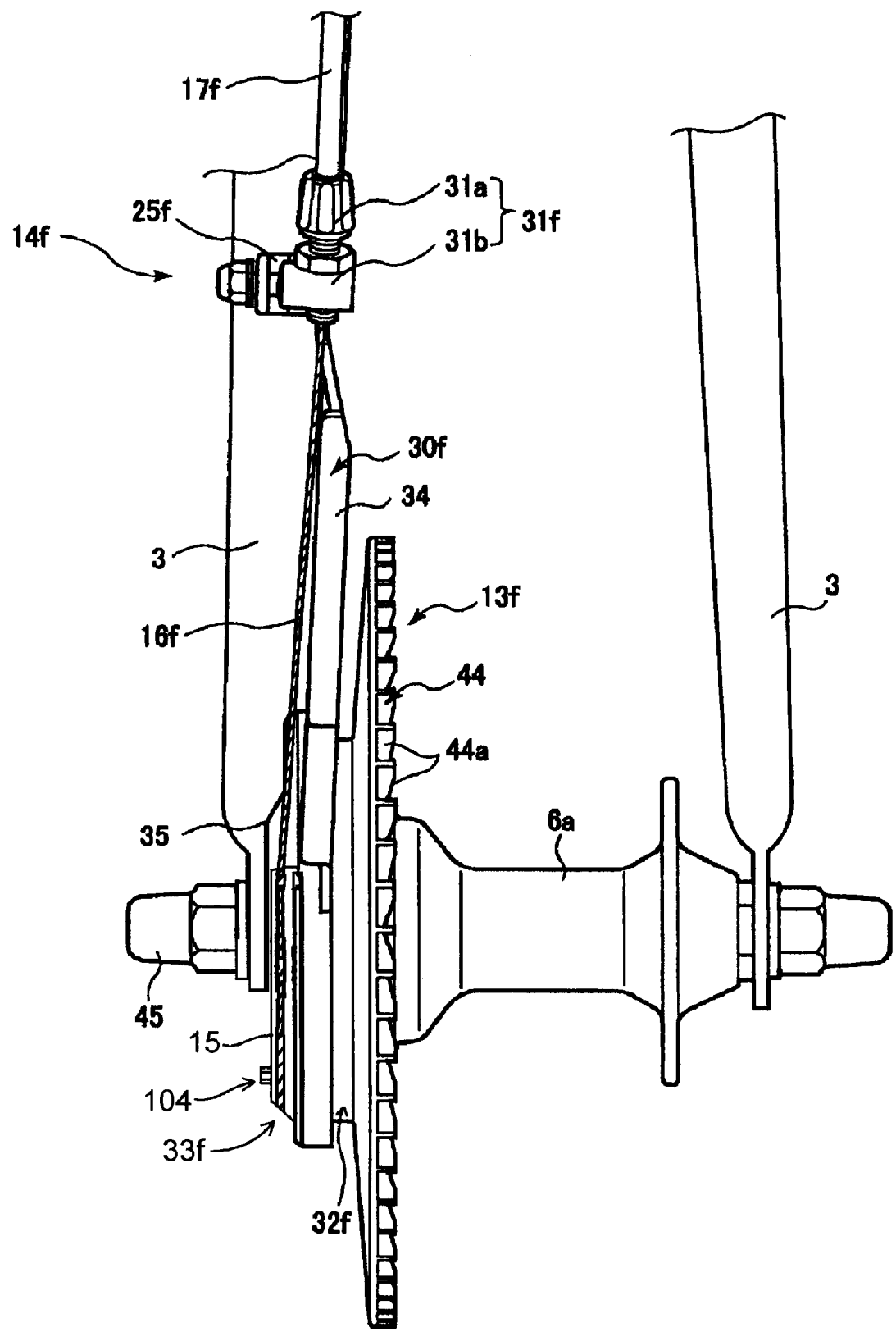
FIG. 4 is a front view of the front brake device.
Figure 5:
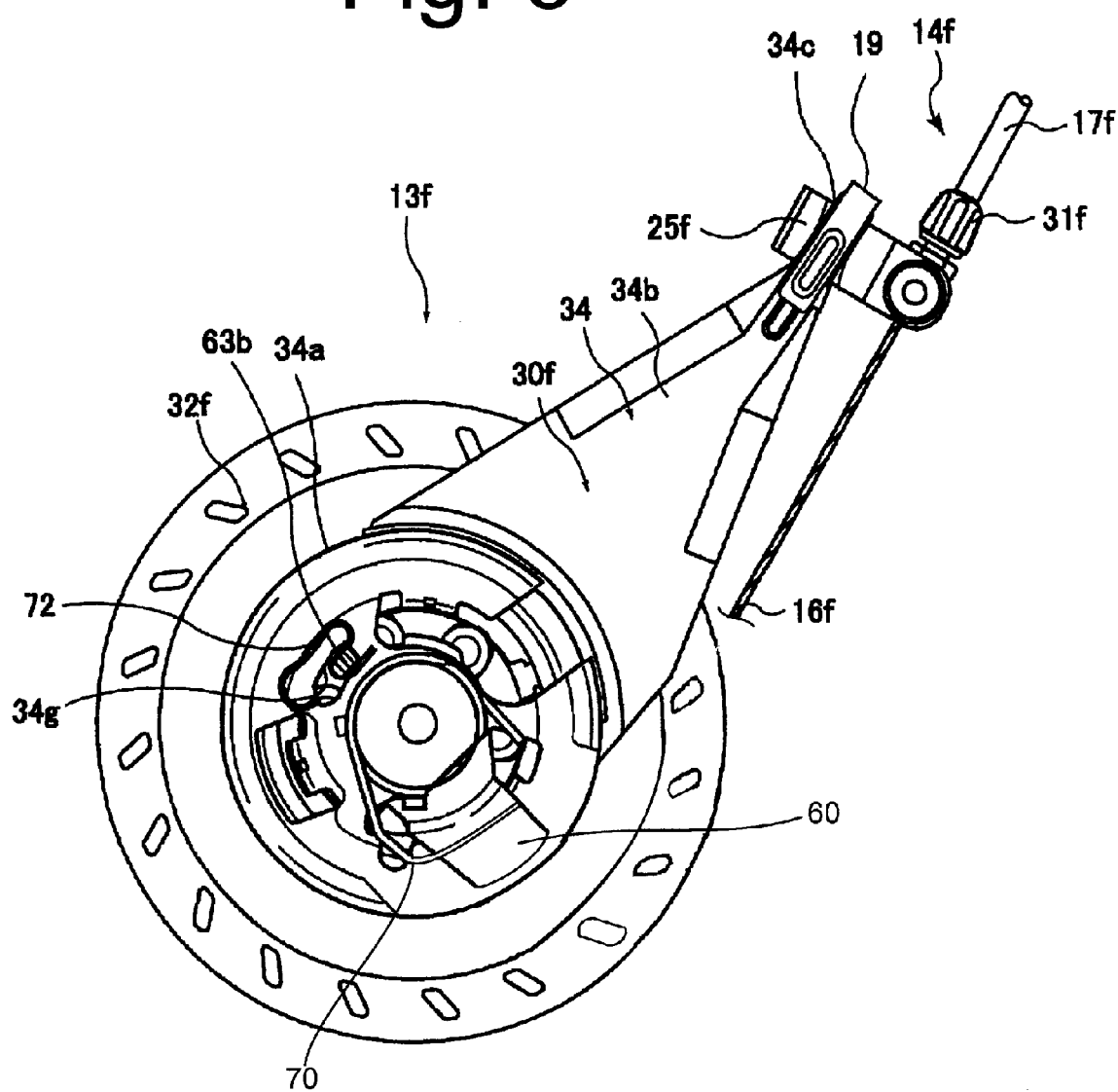
FIG. 5 is a side view of the front brake device with the cover removed.
Figure 6:
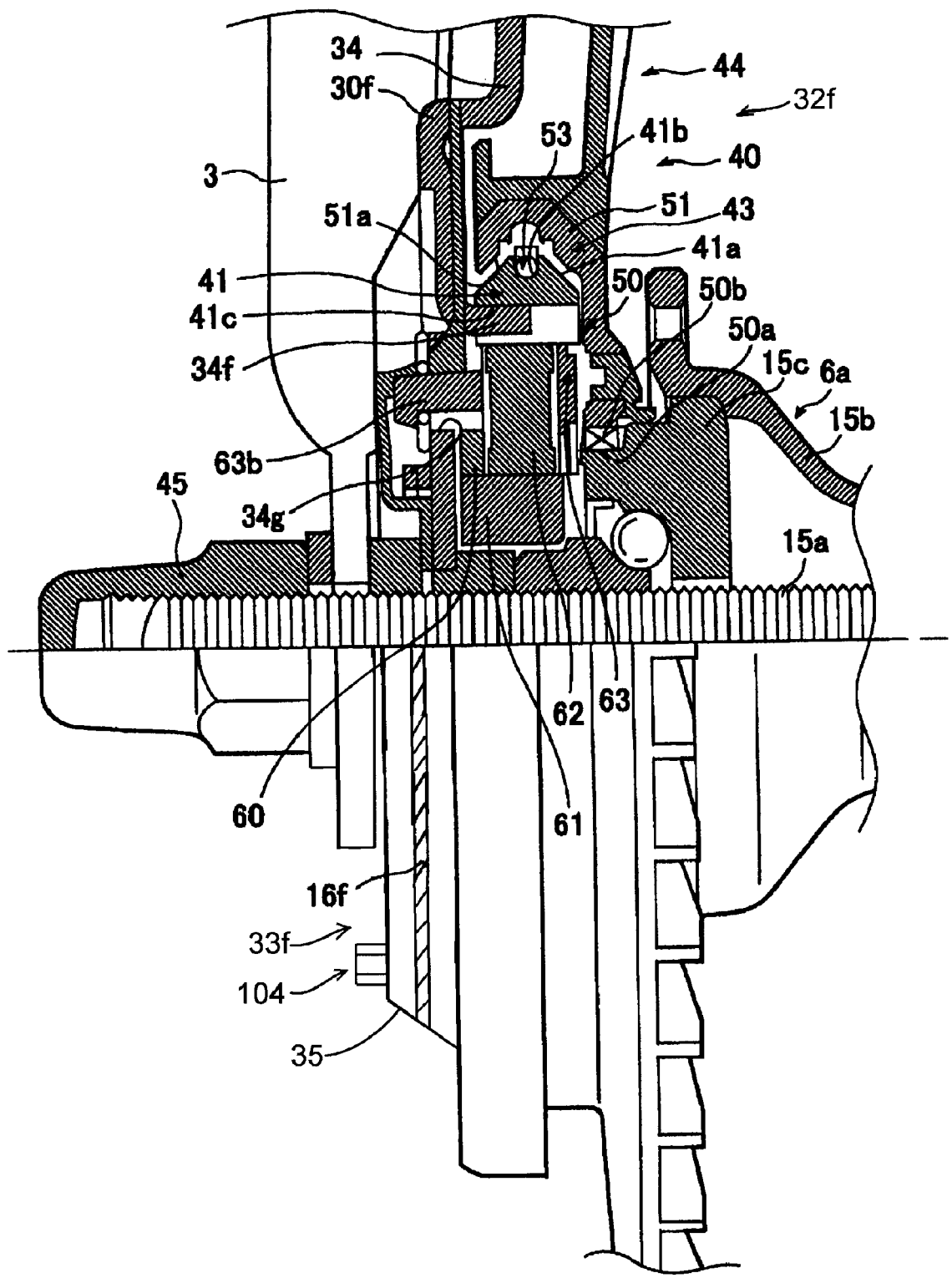
FIG. 6 is an enlarged partial cross-sectional view of the front brake device.

Front wheel 6 and rear wheel 7 have front and rear hubs 6a (FIG. 4, wherein only the front hub 6a is shown), each having a hub axle 15a (FIG. 6), front and rear rims 6b, 7b (FIG. 1) disposed at the outside periphery of hubs 6a, tires 6c, 7c attached to front and rear rims 6b, 7b, and spokes 6d, 7d connecting the hubs 6a with the respective rims 6b, 7b. As shown in FIG. 6, hub axle 15a is nonrotatably mounted on front fork 3 of frame 2, and a hub body 15b is rotatably supported on hub axle 15a. Front hub 6a has a quick release lever 6e (FIG. 1) to provide a quick release hub that is easy to detach. The quick release mechanism is known and described, for example, in the 1993 Japanese Industrial Standard (JIS) Bicycle Edition, p. 276, published by Jitensha Sangyo Shinko Kyokai. Thus, a detailed description of the quick release mechanism will not be provided here. In this embodiment, hubs 6a are fastened to the front fork 3 and chainstay 2a with an ordinary hexagon cap nut 45.

Figure 2:
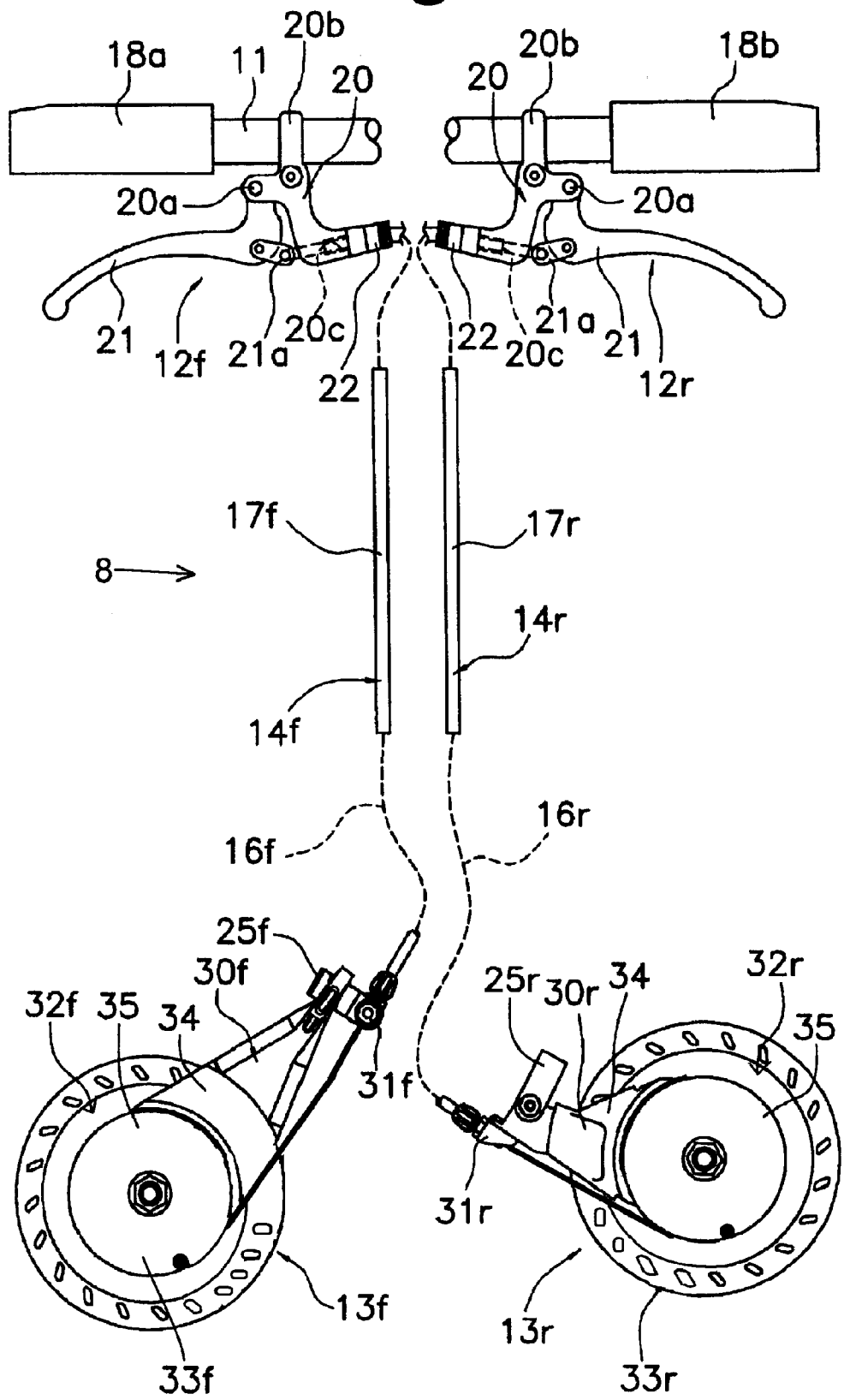
FIG. 2 is a schematic illustration of a particular embodiment of a brake system for the bicycle.

As shown in FIG. 2, brake system 8 has front and rear brake levers 12f, 12r, brake devices 13f, 13r actuated by front and rear brake levers 12f, 12r, and front and rear brake cables 14f, 14r respectively linking the front and rear brake levers 12f, 12r with the front and rear brake devices 13f, 13r. Brake cables 14f, 14r have inner cables 16f, 16r, the two ends of which are linked to front and rear brake levers 12f, 12r and the front and rear brake devices 13f, 13r. Brake cables 14f, 14r also have outer cables 17f, 17r sheathing the inner cables 16f, 16r. The front brake lever 12f is mounted to the inside of a grip 18a mounted on the left end of handlebar 11, and the rear brake lever 12r is mounted to the inside of a grip 18b mounted on the right end of handlebar 11. Brake levers 12f, 12r are identical components disposed in a mirror image relationship. Each brake lever 12f, 12r has a lever bracket 20 mounted on handlebar 11, a lever member 21 pivotably supported on a pivot shaft 20a on lever bracket 20, and an outer detaining portion 22 screwed onto lever bracket 20. Each lever bracket 20 has a mounting portion 20b and a female threaded portion 20c, wherein mounting portion 20b is detachably mountable to handlebar 11, and outer detaining portion 22 is threaded into female threaded portion 20c. Inner cables 16f, 16r pass through their respective outer detaining portions 22 and are detained by corresponding inner detaining portions 21a mounted to each lever member 21. Lever member 21 is biased towards the brake release position by a biasing member (not shown).

In this embodiment, the front and rear brake devices 13f, 13r are roller brake devices. Brake devices 13f, 13r function to brake the hub 6a of front wheel 6 and rear wheel 7, respectively. As shown in FIGS. 2-5 and 7, brake devices 13f, 13r have fastening brackets 30f, 30r for nonrotatably fastening brake devices 13f, 13r to the front fork 3 or chainstay 2a of the bicycle; brake mechanisms 32f, 32r; and brake actuating units 33f, 33r including a rotating member in the form of a cover member 35 for actuating the brake mechanisms 32f, 32r.

Each fastening bracket 30f, 30r has a bracket body 34 with a first face and a second face produced, for example, by press forming a sheet of steel. Bracket body 34 has a base portion 34a (FIG. 7), a tapering arm portion 34b that extends substantially diametrically from base portion 34a, and a detaining portion 34c formed at the distal end of arm portion 34b with a substantially equal width plate configuration. Base portion 34a includes an opening 34h dimensioned for receiving hub axle 15a therethrough, a very short tubular portion 34d, three axially extending shoe detaining projections 34f, and a spring detaining portion 34g. As shown in FIG. 6, cover member 35 and the base portion 34a of bracket body 34 are retained to hub axle 15a by means of hexagonal cap nut 45 screwed onto one end of hub axle 15a.

Figure 3:
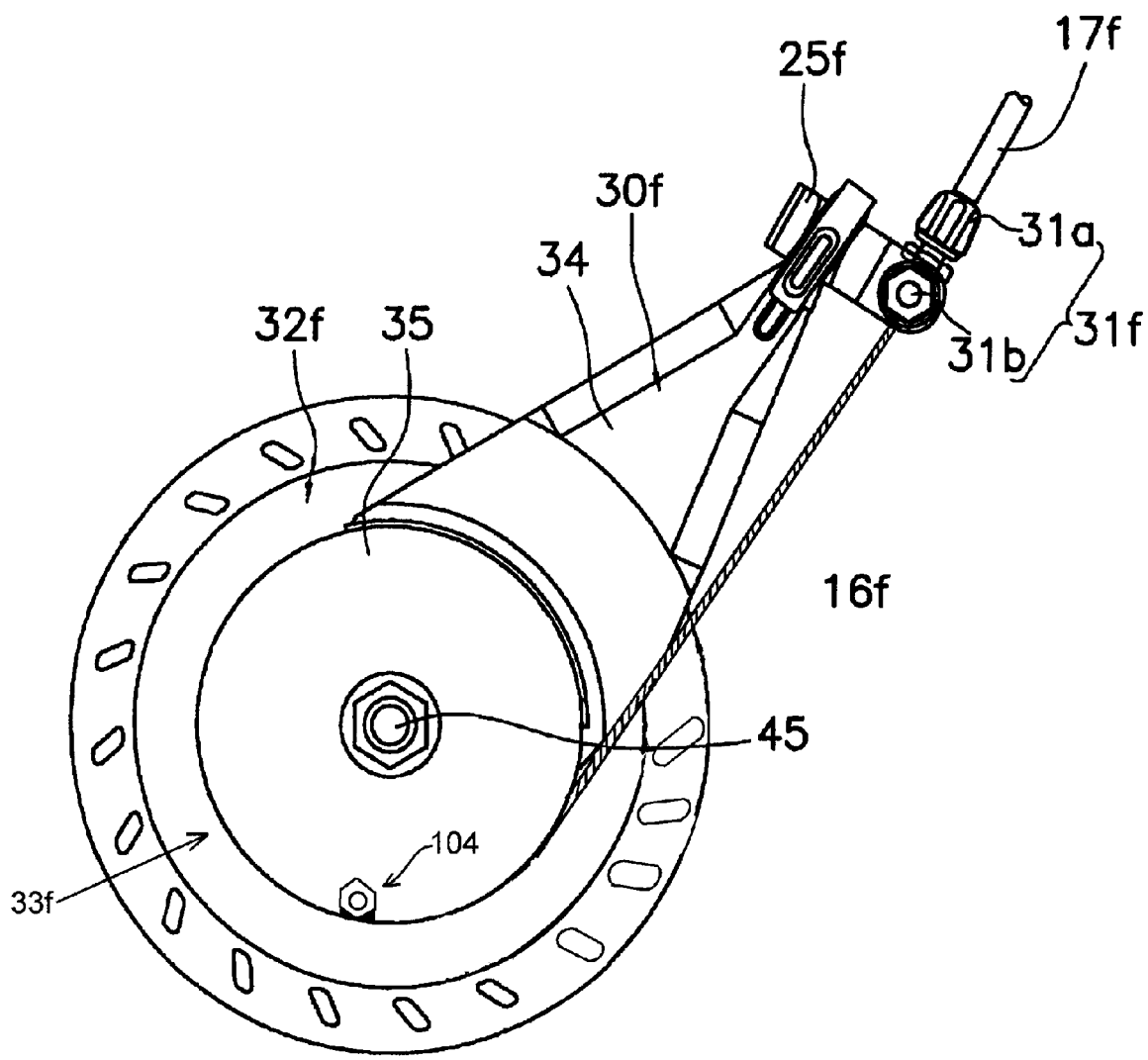
FIG. 3 is a side view of a particular embodiment of a front brake device.

The detaining portion 34c of bracket body 34 is fastened to front fork 3 or chainstay 2a through a bracket fastening member 25f or 25r and an insert member 19. The brake manufacturer supplies bracket fastening member 25f together with the front brake device 13f, and it is welded to the front fork 3 of the bicycle frame 1. Bracket fastening members 25f, 25r have mounted (e.g., screwed) thereon outer mounting portions 31f, 31r for detaining outer cables 17f, 17r, respectively. As shown in FIG. 3, outer mounting portion 31f has an outer detaining portion 31a and an outer fastening portion 31b. Outer detaining portion 31a is provided for detaining outer cable 17f, and outer fastening portion 31b is provided for fastening outer detaining portion 31a in such a way that the detaining position of outer detaining portion 31a in the cable axis direction is adjustable by means of a screw. Brake play (i.e. the gap between the brake drum and the brake shoe) can be adjusted by adjusting this axial position. Since outer mounting portion 31f is mounted to bracket body 34, there is no need to attach or detach outer cable 17f when attaching or detaching front wheel 6.

Since brake mechanisms 32f, 32r are of substantially identical structure, only front brake mechanism 32f will be described in detail. As shown in FIG. 6, front brake mechanism 32f has a brake drum 40 and a brake shoe 41. Brake drum 40 has a cylindrical drum body 43 that rotates integrally with hub body 15b through a left adapter 15c. Drum body 43 is a stainless steel alloy member having a bowl configuration with a bottom portion 50 and a peripheral portion 51 formed at the outer periphery of bottom portion 50. A contoured (splined) portion 50b is formed on the inside peripheral surface of an opening 50a in bottom portion 50, wherein the splined portion 50b meshes with a complementary splined portion formed on the outer peripheral surface of left adapter 15c. As a result, drum body 43 is nonrotatably mounted relative to hub body 15b. A cooling disk 44 made of aluminum alloy is thermally coupled to the outer peripheral surface of drum body 43.

A circular brake face 51a is formed on the inside peripheral face of peripheral portion 51 of drum body 43, wherein brake shoe 41 is capable of contacting with and releasing from brake face 51a to provide a braking force to brake drum 40. Brake face 51a is produced by recessing the axial center portion of peripheral portion 51 in a trapezoidal shape whose cross section constricts in width going radially outwardly.

Figure 7:
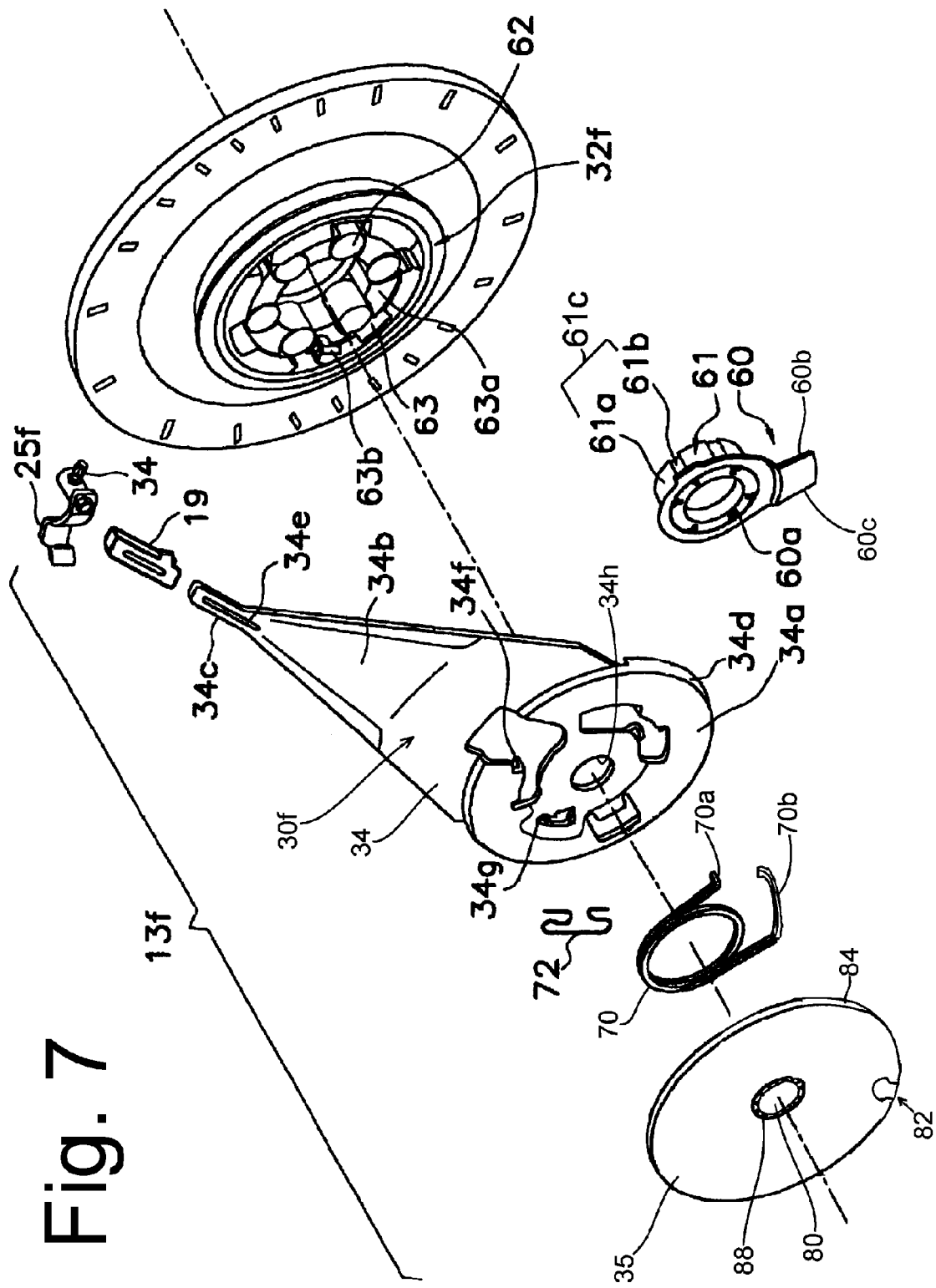
FIG. 7 is an exploded view of a particular embodiment of the bicycle brake device.
Figure 8:
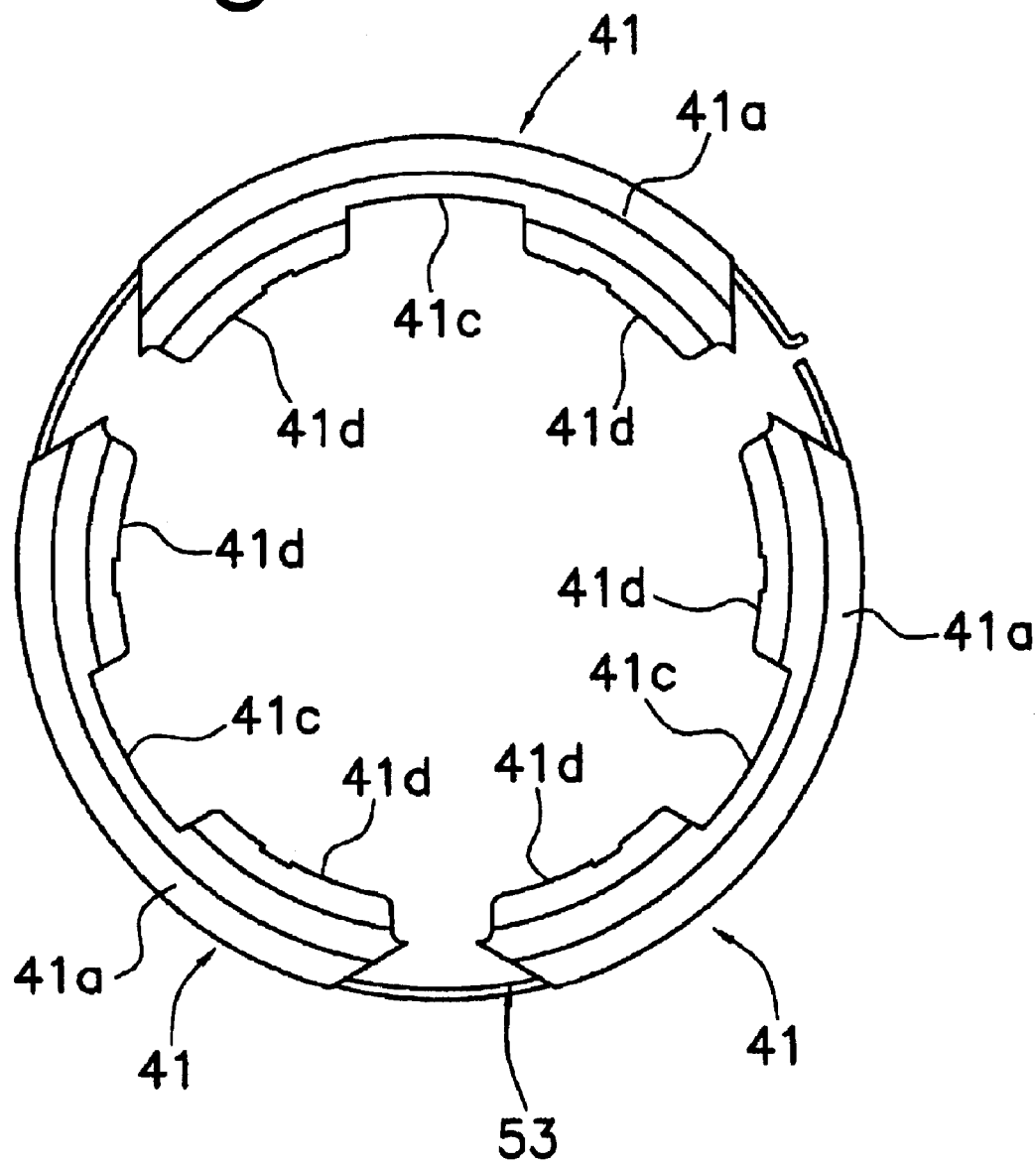
FIG. 8 is a side view of a particular embodiment of a brake shoe assembly.
Figure 9:
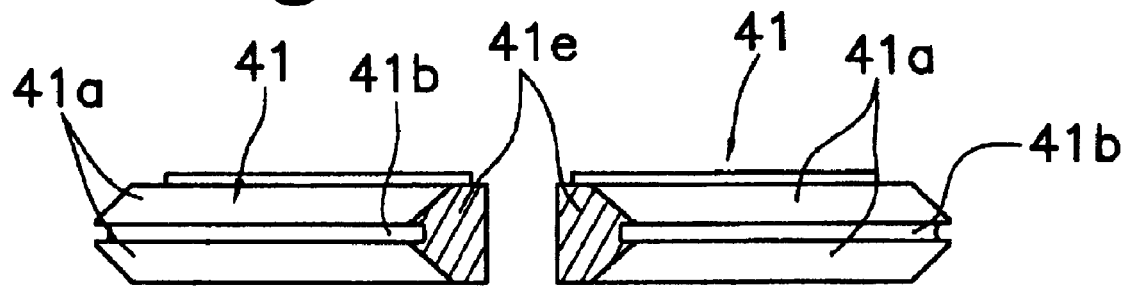
FIG. 9 is a plan view of a portion of the brake shoe assembly.

In this embodiment, as shown in FIGS. 8 and 9, brake shoe 41 comprises a ring-shaped member circumferentially divided into three segments. A contact face 41a is formed on the outer peripheral surface of each segment of brake shoe 41 for contacting the brake face 51a of drum body 43 during braking. Each contact face 41a has a cross sectional shape in the form of a trapezoid projecting convexly in the radially outward direction so as to contact brake face 51a. In the center of contact face 41a is formed an annular spring recess 41b in which a first spring member 53 is mounted. First spring member 53 is an annular spring member formed by bending elastic wire material into a circle. Such a configuration makes it easy to bias each segment of brake shoe 41 towards a position away from brake drum 40 (i.e., radially inward). Three radially outwardly recessed rotation stop portion 41c and six roller contacting faces 41d are formed on the inner peripheral surface of brake shoe 41. The three shoe detaining projections 34f (FIGS. 6 and 7) formed on bracket body 34 of fastening bracket 30f fit within these rotation stop portions 41c, thus substantially preventing rotation of the segmented brake shoe 41 relative to bracket body 34. Of course, brake shoe 41 will rotate slightly due to play between detaining projections 34f and rotation stop portions 41c.

Brake actuating units 33f, 33r are substantially identical in construction despite their difference in shape, so only the front brake actuating unit 33f will be described in detail. Brake actuating unit 33f is used to push the segments of brake shoe 41 towards brake drum 40. As shown in FIGS. 6 and 7, brake actuating unit 33f includes cover member 35 rotatably mounted relative to bracket body 34, an actuating member in the form of an actuating arm 60 adapted to be mounted between bracket body 34 of fastening bracket 30f and drum body 43 so that actuating arm 60 rotates round hub axle 15a; a cam member 61 that rotates integrally with actuating arm 60; a plurality of (e.g., six) rollers 62 disposed between and contacting cam member 61 and brake shoe 41; and a roller case 63 for holding the rollers 62 spaced apart from each other in the rotation direction.

Actuating arm 60 is fabricated from a metal plate. The basal end of actuating arm 60 is bent and has a mating hole 60a for mating with the outside peripheral face of cam portion 61. Actuating arm 60 rotates between a brake released position (shown in FIG. 17) and a braking position (shown in FIG. 18). Actuating arm 60 is biased toward the brake released position by a second spring member 70 in the form of a torsion coil spring. One end 70a of spring member 70 is detained to bracket body 34, and the other end 70b of spring member 70 is detained to actuating arm 60. Second spring member 70 is covered by cover member 35.

Figure 17:
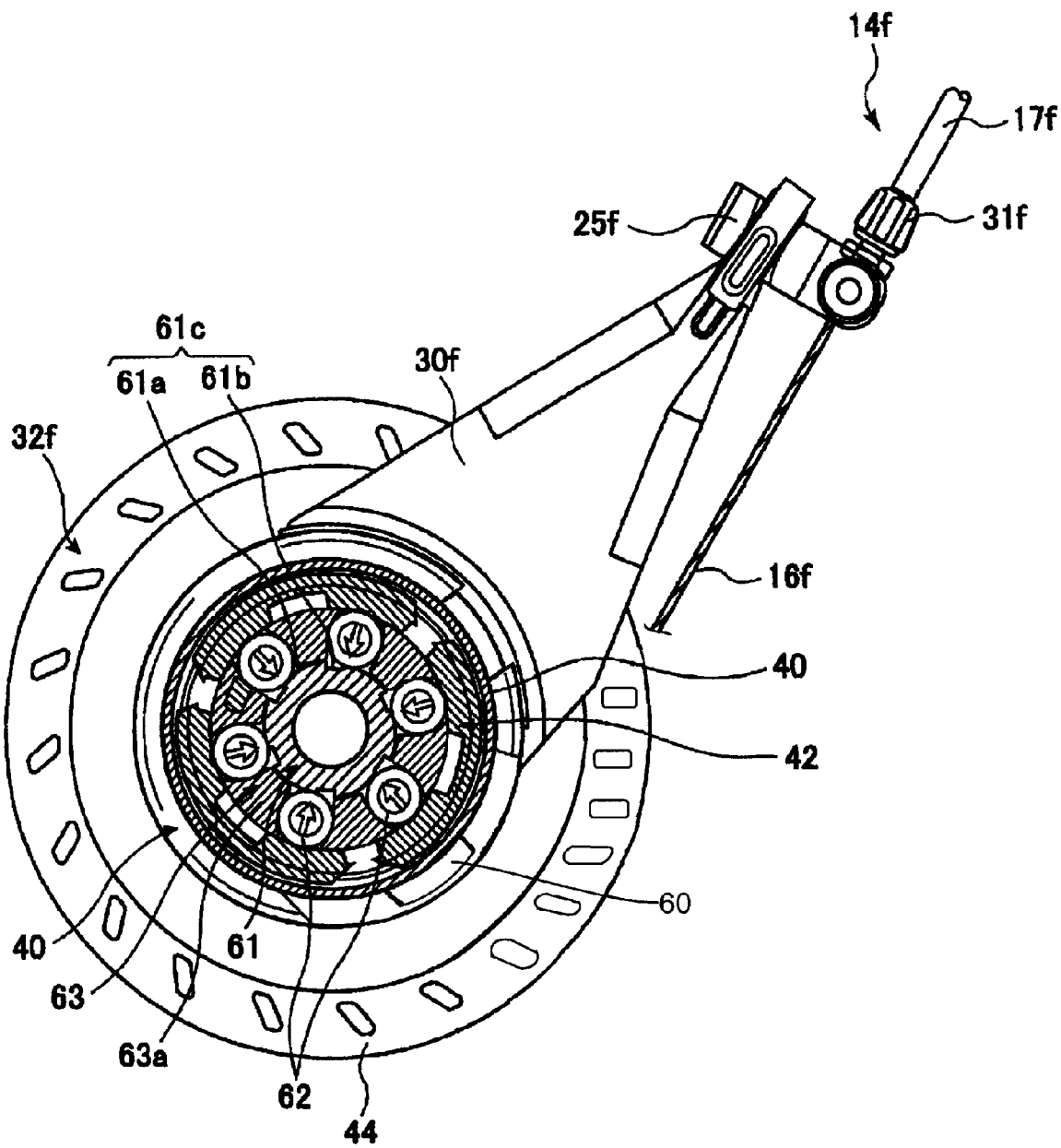
FIG. 17 is a partial cross sectional view of the brake device in a brake released state.
Figure 18:
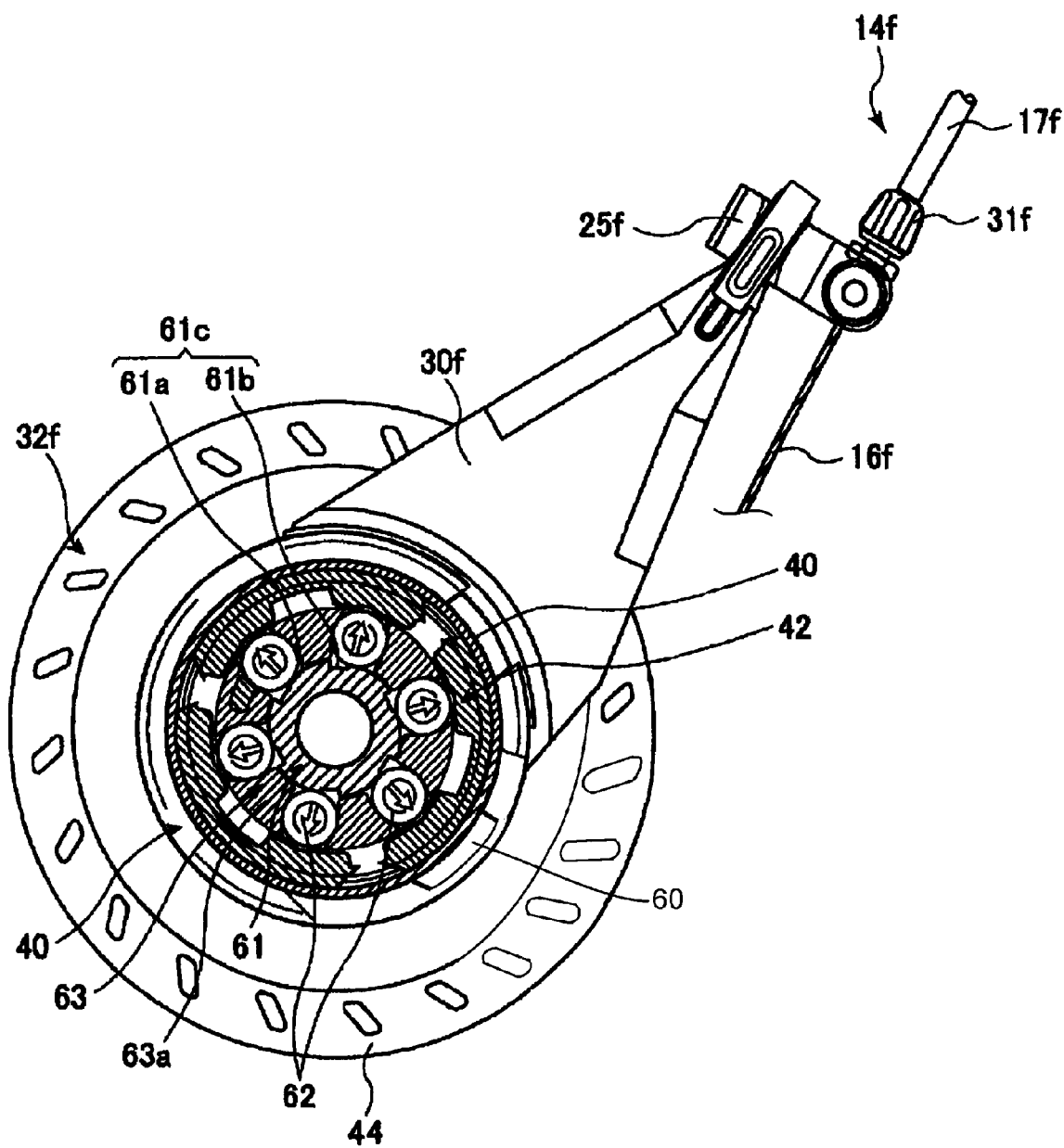
FIG. 18 is a partial cross sectional view of the brake device in a brake activated state.

Cam member 61 is nonrotatably fixed to actuating arm 60 so that it rotates in response to rotation of actuating arm 60, and it may be formed by a thick-walled tubular member made of steel. As shown in FIGS. 7, 17 and 18, a plurality of cam portions 61c are formed on the outer peripheral face of cam member 61. Each cam portion 61c has a sloping cam face 61a and a recessed portion 61b. In this embodiment, the radial distance of each cam face 61a increases gradually in the clockwise direction, and the recessed portions 61b are recessed below adjacent pairs of sloping cam faces 61a.

Rollers 62 are mounted between the outer peripheral surface of cam member 61 and the roller contacting faces 41d of brake shoe 41. Rollers 62 push against brake shoe 41 in response to the rotation of cam member 61. Rollers 62 are mounted in roller case 63 such that they are spaced apart in a circumferential direction while being capable of radial movement in response to rotation of cam member 61. More specifically, a plurality of (e.g., six) retaining projections 63a are formed in roller case 63. Retaining projections 63a are circumferentially spaced apart and project outwardly in the hub axial direction for retaining rollers 62. Roller case 63 is nonrotatably detained to bracket body 34 by means of a retaining projection 63b that projects axially further than the other retaining projections 63a and engages retaining slot 34g in bracket body 34. A third spring member 72 is mounted between retaining projection 63b and bracket body 34 for biasing roller case 63 in the clockwise direction in FIG. 7. Thus, rollers 62 are substantially rotationally fixed relative to bracket body 34. Grease is packed within roller case 63 around rollers 62 so that rollers 62 can move smoothly in the radial direction in response to the rotation of cam member 61. The use of rollers also helps to minimize evaporation of grease and the fluctuation in braking performance due to a rise in brake temperature.

Figure 11:
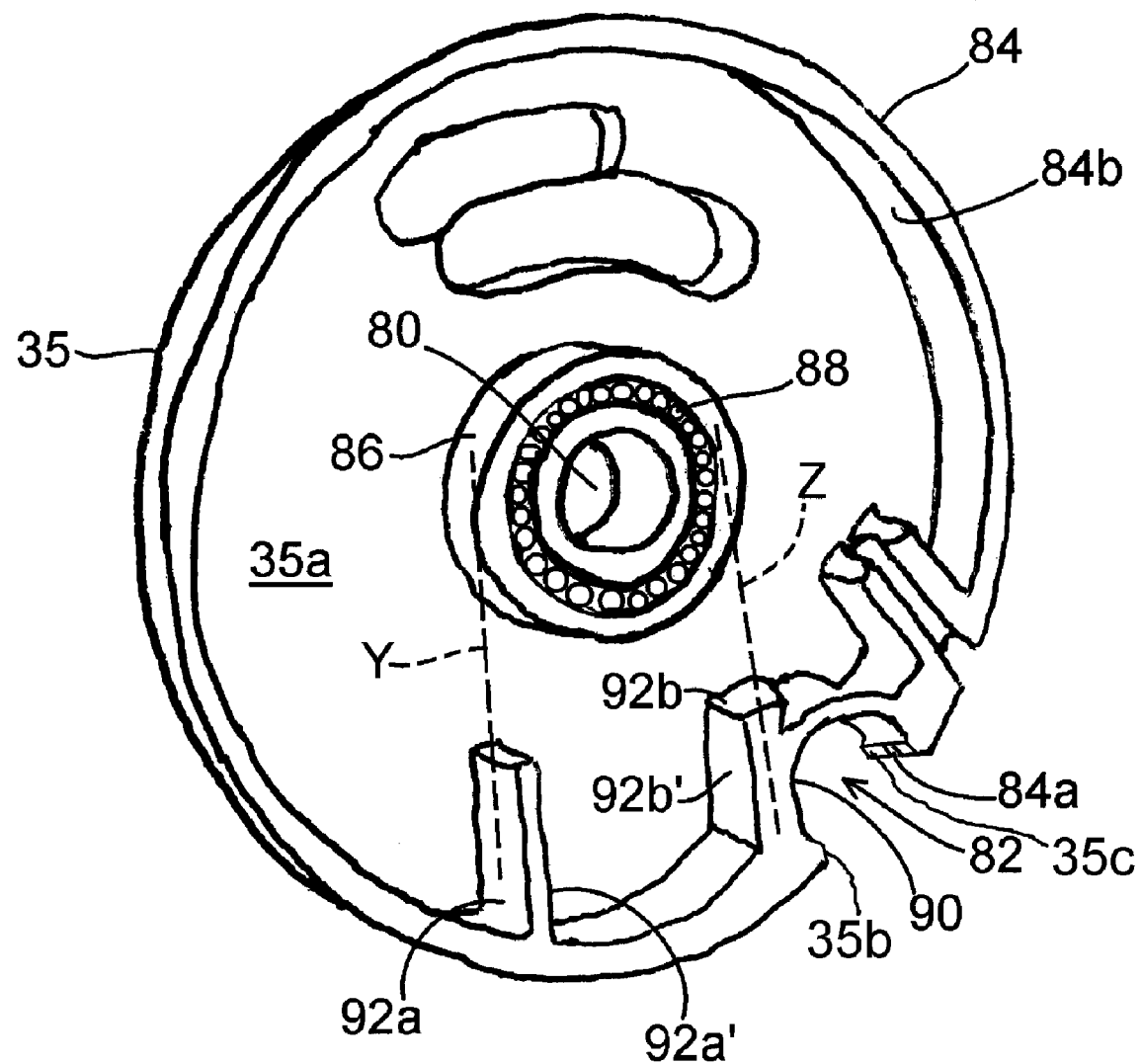
FIG. 11 is an oblique inner view of the cover member.

FIG. 10 is an oblique outer view of cover member 35, and FIG. 11 is an oblique inner view of cover member 35. As shown in FIG. 10, cover member 35 is a disk shaped member, and it includes a central opening 80 and a brake control element mount 82, wherein central opening 80 is dimensioned for receiving hub axle 15a therethrough. As shown in FIG. 11, cover member 35 also includes an axially extending substantially circular outer peripheral flange 84 with a cable winding groove 84a upon which inner cable 16f abuts and is wound, an axially extending inner peripheral flange 86 that houses a cartridge bearing 88, an axially extending reinforcing flange 90 for reinforcing brake control element mount 82, and an actuating member moving unit 92 that extends from an inner side surface 35a of cover member 35.

Actuating member moving unit 92 comprises elongated generally rectangular projections 92a and 92b. In this embodiment, projection 92a extends radially inwardly at an incline from an inner peripheral surface 84b of outer peripheral flange 84. In other words, a phantom axis Y defined by the direction of projection 92a does not intersect the center of opening 80. Similarly, projection 92b extends radially inwardly at an incline from inner peripheral surface 84b of outer peripheral flange 84 so that a phantom axis Z defined by the direction of projection 92b does not intersect the center of opening 80. In this embodiment, phantom axes Y and Z straddle central opening 80.

Projections 92a and 92b are spaced apart from each other such that, when cover member 35 is mounted to fastening bracket 30f, projections 92a and 92b straddle the distal end of actuating arm 60. Thus, rotating cover member 35 in a clockwise direction shown in FIG. 7 would cause a circumferentially facing side surface 92a' of projection 92a to contact a side surface 60b of actuating arm 60, thereby rotating actuating arm 60 clockwise. Similarly, rotating cover member 35 in a counterclockwise direction would cause a circumferentially facing side surface 92b' of projection 92b to contact a side surface 60c of actuating arm 60, thereby rotating actuating arm 60 counterclockwise. Since actuating arm 60 does not project radially outwardly of cover member 35, there is no risk of snagging actuating arm 60 with outside objects.

As shown more clearly in FIG. 12, brake control element mount 82 comprises a mounting opening 100 that curves in a generally circular manner for more than 180°. The surface of cover member 35 that forms opening 100 forms first and second substantially parallel walls 35b and 35c that form a side entrance into opening 100. As shown in FIG. 11, reinforcing flange 90 follows the shape of opening 100 and walls 35b and 35c to reinforce the strength of brake control element mount 82 accordingly.

Figure 13:
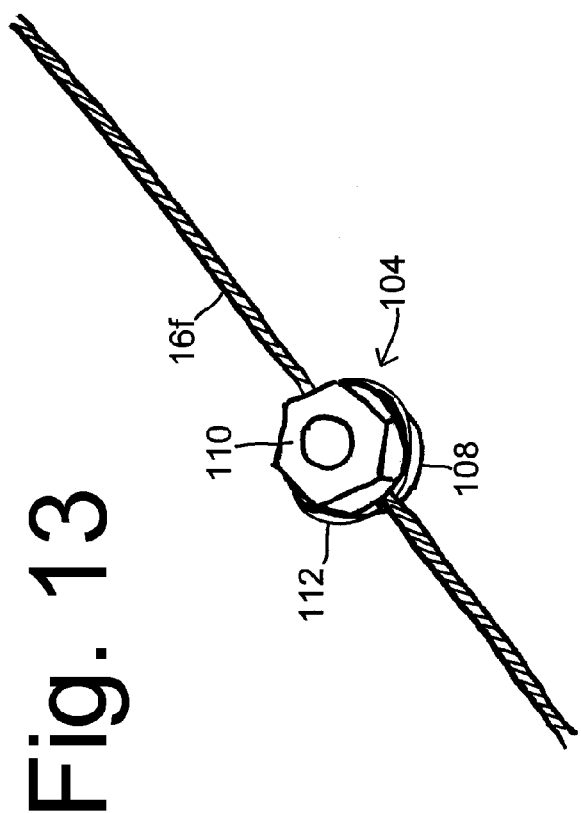
FIG. 13 is a more detailed view of a brake cable attachment unit.
Figure 14:
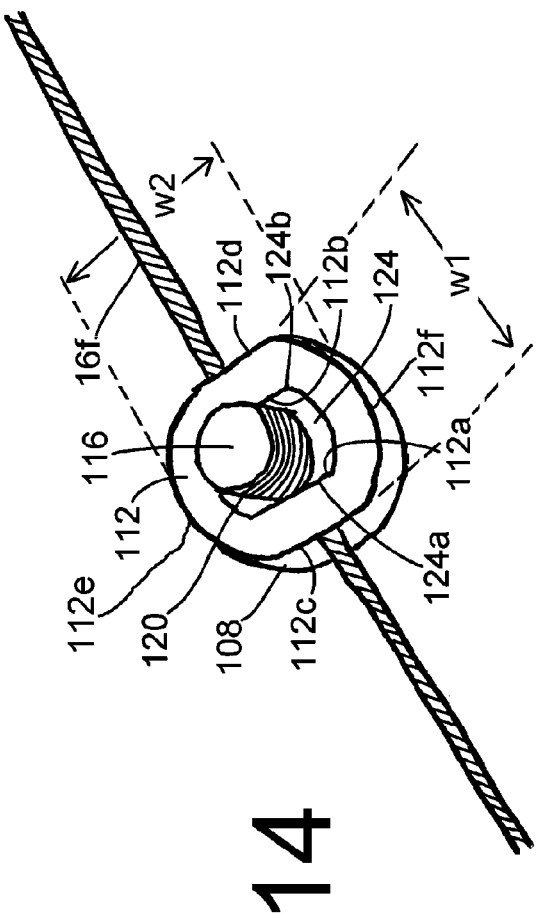
FIG. 14 is a view of the brake cable attachment unit with the nut removed.
Figure 15:
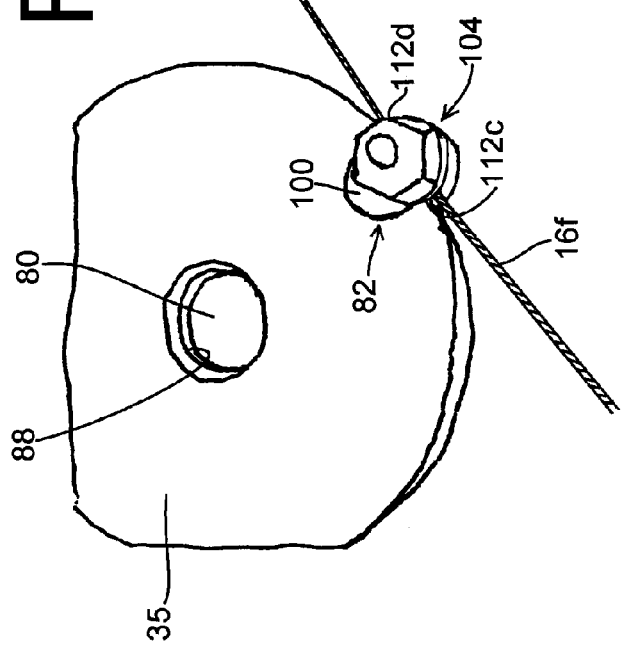
FIG. 15 is a view of the brake cable attachment unit being inserted into the brake control element mount in the cover member.
Figure 16:
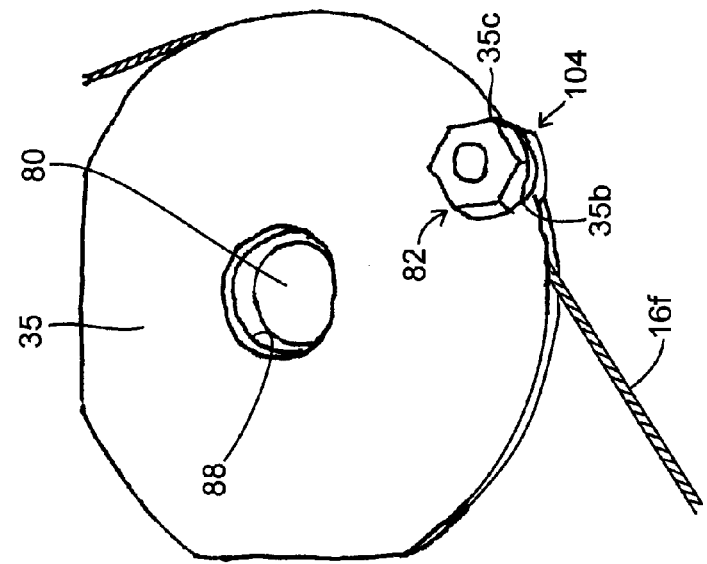
FIG. 16 is a view of the brake cable attachment unit attached to the cover member.

FIG. 13 is a detailed view of a brake control element attachment unit in the form of a brake cable attachment unit 104 attached to inner cable 16f. Brake cable attachment unit 104 comprises a bolt 108, a nut 110 and a locking member in the form of a washer 112. FIG. 14 is a view of brake cable attachment unit 104 with nut 110 removed. As shown more clearly in FIG. 14, bolt 108 comprises a shank 116 with a male threaded portion 120 and a locking portion 124. Locking portion 124 has a larger diameter than threaded portion 120, and it includes an opening (not shown) for receiving inner cable 16$f$ therethrough and parallel flat surfaces 124$a$ and 124$b$. Washer 112 is an annular member with a pair of substantially parallel inner surfaces 112$a$ and 112$b$ that engage the parallel flat surfaces 124$a$ and 124$b$ on locking portion 124 of shank 120. Washer 112 also includes a pair of substantially parallel flat outer surfaces 112$c$ and 112$d$ and a pair of curved outer surfaces 112$e$ and 112$f$. Parallel outer surfaces 112$c$ and 112$d$ have a width W1 such that they are able to pass through parallel walls 35$b$ and 35$c$ as shown in FIG. 15 so that brake cable attachment unit 104 may be positioned in brake control element mount 82. Curved outer surfaces 112$e$ and 112$f$ have a width W2 greater than width W1 for reasons discussed below.

During assembly, the drum body 43 and cooling disk 44 forms are fabricated by a process such as die casting or forging, and the forms are then finished to the desired dimensions by machining processes. Cooling disk 44 then is mounted onto the outside peripheral surface of drum body 43 in a known manner. Then, two segments of brake shoe 41 and the first spring member 53 are assembled and mounted inside the drum body, and the remaining segment of brake shoe 41 is attached. The interior may be packed with ample grease at this time. When the mounting of brake shoe 41 is completed, the segments of brake shoe 41 are pushed against brake face 51$a$, the rollers 62 are mounted in the roller case 63, and rollers 62 and roller case 63 are inserted radially inwardly of brake shoe 41. The interior may be further coated with ample grease at this time. Then, cam member 61 with the attached actuating arm 60 is inserted radially inwardly of rollers 62, third spring member 72 is hooked between bracket body 34 and detaining projection 63$b$ of roller case 63, and cover member 35 is placed over hub axle 15$a$.

To attach brake cable attachment unit 104 to inner cable 16$f$, inner cable 16$f$ is threaded through the opening in locking portion 124 of shank 116 of bolt 108. Then, washer 112 is placed on locking portion 124, with inner surfaces 112$a$ and 112$b$ of washer 112 engaging the corresponding flat surfaces 124$a$ and 124$b$ of locking portion 124. Finally, nut 110 is screwed onto threaded portion 120 of bolt 108 to fasten inner cable 16$f$ to bolt 108. Brake cable attachment unit 104 then is oriented so that outer surfaces 112$c$ and 112$d$ of washer 112 align with parallel walls 35$b$ and 35$c$ of cover member 35, and brake cable attachment unit 104 is inserted into opening 100 in brake control element mount 82.

When assembling the front wheel 6 having the brake device 13$f$ mounted thereon onto the front fork 3, the insert member 19 mounted on the detaining portion 34$c$ of bracket body 34 of brake device 13$f$ is pushed into bracket fastening portion 25$f$, and the hub axle 15$a$ of hub 6$a$ is mounted on front fork 3. The hexagonal cap nuts 45 are then installed on both ends of hub axle 15$a$ and tightened to the appropriate level of torque to retain cover member 35 to fastening bracket 30$f$ and complete the mounting of front wheel 6.

The disassembly procedure is the reverse of the above. Unlike conventional brake cable retaining devices, brake cable 16$f$ can be detached from cover member 35 simply by removing brake cable attachment unit 104 without the use of tools. When brake cable 16$f$ is reattached, the former adjustment of brake shoe 41 is maintained, so the adjustment of brake shoe 41 need not be repeated.

The operation of brake devices 13$f$, 13$r$ will be described with reference to the front brake device 13$f$ described above. With the brake cables 14$f$, 14$r$ set up, the inner cables 16$f$, 16$r$ are under tension, and play between brake shoe 41 and brake drum 40 in the absence of operation of brake levers 12$f$, 12$r$ may be adjusted by means of the outer detaining portion 22 mounted on brake levers 12$f$, 12$r$ or the outer mounting portions 31$f$, 31$r$ mounted on brake device 13$f$, 13$r$. In this state, squeezing front brake lever 12$f$ pulls inner cable 16$f$, thus causing cover member 35 to rotate counterclockwise. At this time, the parallel outer surfaces 112$c$ and 112$d$ of washer 112 rotate out of alignment with parallel walls 35$b$ and 35$c$ of cover member 35 because brake control element mount 82 rotates relative to the rotationally stationary brake cable attachment unit 104. Because width W2 between curved walls 112$e$ and 112$f$ is greater than width W1 between parallel walls 112$c$ and 112$d$, curved walls 112$e$ and 112$f$, and hence washer 112, cannot pass between walls 35$ba$ and 35$c$ of cover member 35. This prevents brake cable attachment unit 104 from detaching from cover member 35, further enhancing reliability of the connection.

The counterclockwise motion of cover member 35 is communicated through side surface 92$b'$ of projection 92$b$ of cover member 35 to side surface 60$c$ actuating arm 60, thereby rotating actuating arm 60 counterclockwise in opposition to the biasing force of second spring member 70. As a result, actuating arm 60 rotates from the brake release position shown in FIG. 17 to the braking position shown in FIG. 18.

When actuating arm 60 rotates to the braking position, cam member 61 rotates integrally therewith, and the rollers 62 ride up over the sloped cam faces 61$a$. As a result, rollers 62 are displaced radially outwardly and press the contact faces 41$a$ of brake shoe 41 against the brake face 51$a$ of brake drum 40 in opposition to the biasing force of first spring member 53. This initially produces a braking force proportional to the pushing force on brake shoe 41. Since brake drum 40 is rotating in the counterclockwise direction of FIG. 18 at this time, brake shoe 41 also turns slightly counterclockwise, and roller case 63 rotates slightly in the same direction via rollers 62. This causes rollers 62 to be displaced further radially outwardly and produces an increased braking force. Since the brake face 51$a$ is recessed in a trapezoidal configuration and the contact face 41$a$ projects outwardly in a trapezoidal configuration, the frictional contact force between the friction faces increases through a wedging action.

When the hand is released from front brake lever 12$f$, actuating arm 60 rotates clockwise to the brake released position in accordance with the biasing force of the second spring member 70, and cover member 35 rotates clockwise accordingly as a result of the contact between side surface 60$c$ of actuating arm 60 and side surface 92$b'$ of projection 92$b$. Since cam member 61 rotates integrally with actuating arm 60, rollers 62 ride down the sloped cam faces 61$a$, and brake shoe 41 moves radially inwardly in accordance with the biasing force of first spring member 53. At this time, the roller case 63 rotates in the clockwise direction in accordance with the biasing force of third spring member 72, and the braking force stops.

While the above is a description of various embodiments of inventive features, further modifications may be employed without departing from the spirit and scope of the present invention. For example, while a roller brake for braking the wheel hub was described, but the hub brake device is not limited thereto. The inventive features may be applied to a band brake or drum brake for braking the hub. The brake face 51$a$ and contact face 41$a$ in the described embodiment have a trapezoidal configuration, but the brake face 51*a* and contact face 41 could be flat faces instead.

Figure 19:
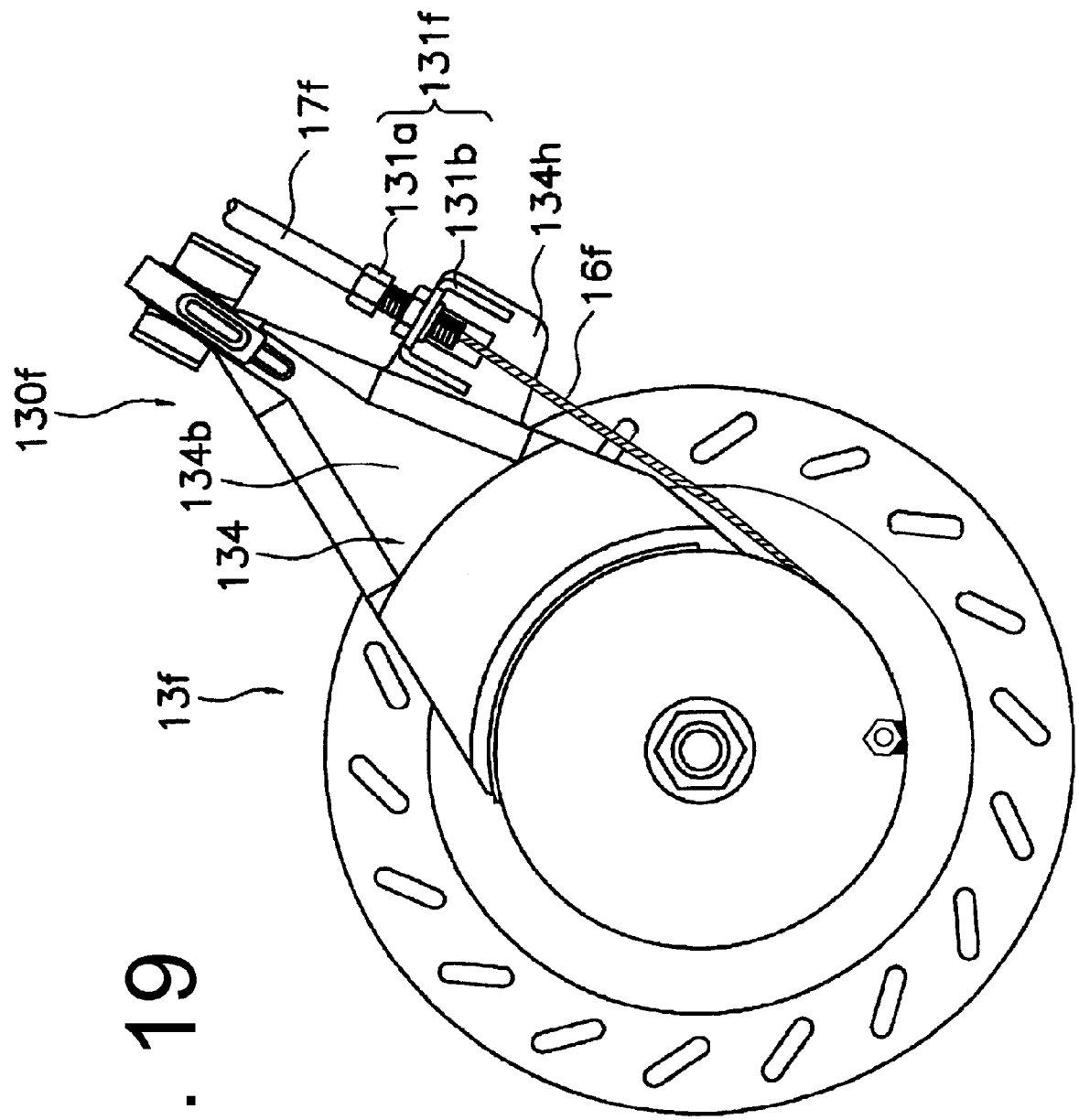
FIG. 19 is a side view of another embodiment of a front brake device.

In the embodiment described above, the outer mounting portion 31*f* for detaining the outer cable 17*f* is disposed on a bracket fastening member 25*f* that has been welded to the front fork 3, but an outer mounting portion 131*f* could instead be disposed on an arm portion 134*b* of a bracket body 134 of a fastening bracket 130*f* as shown in FIG. 19. In this embodiment, arm portion 134*b* has formed thereon an outer mounting bracket 134*h* that projects rearwardly (to the right in FIG. 19). This outer mounting bracket 134*h* detachably detains outer mounting portion 131*f*.

Figure 20:
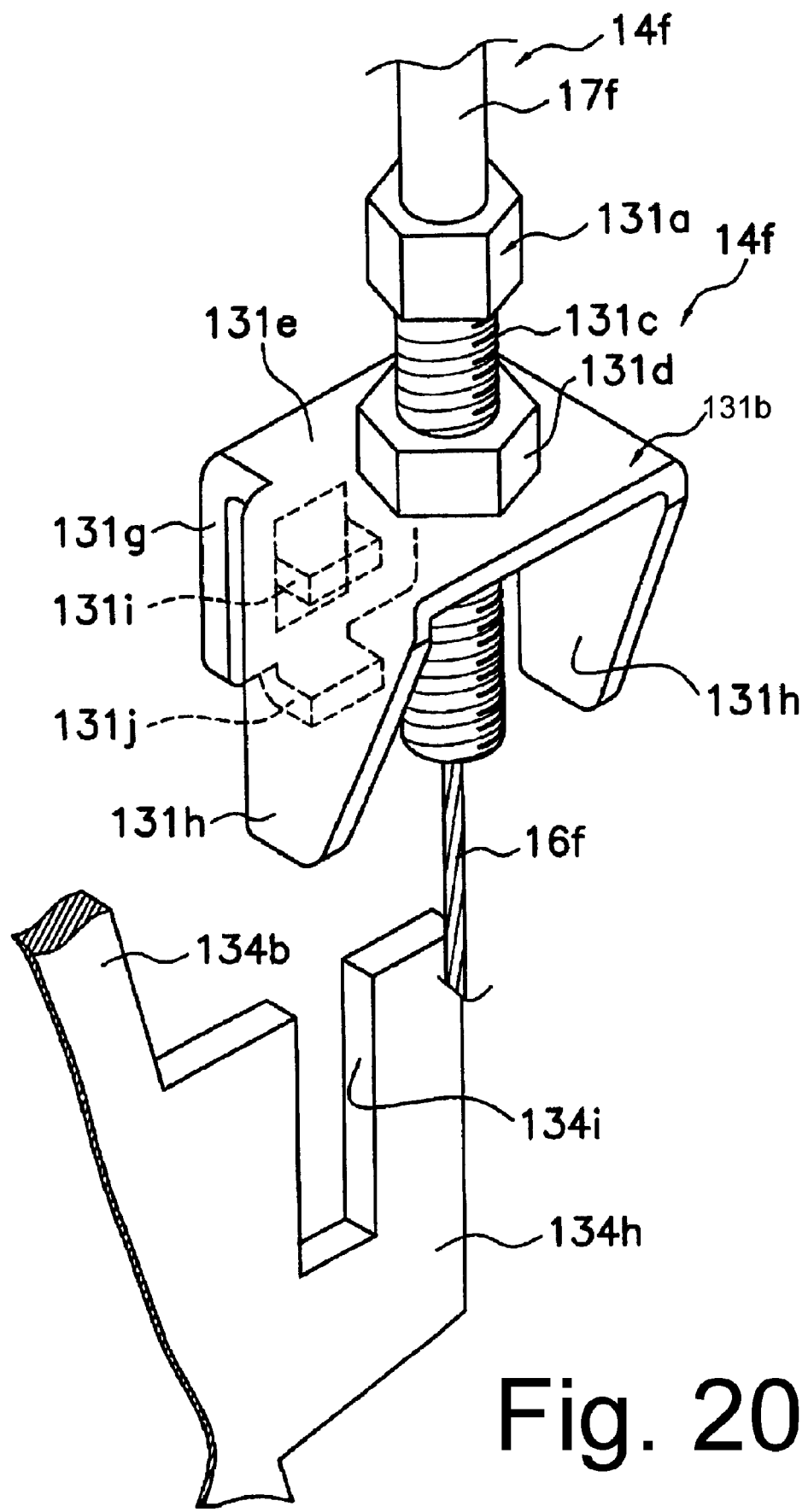
FIG. 20 is a detailed view of an outer mounting portion.
Figure 21:
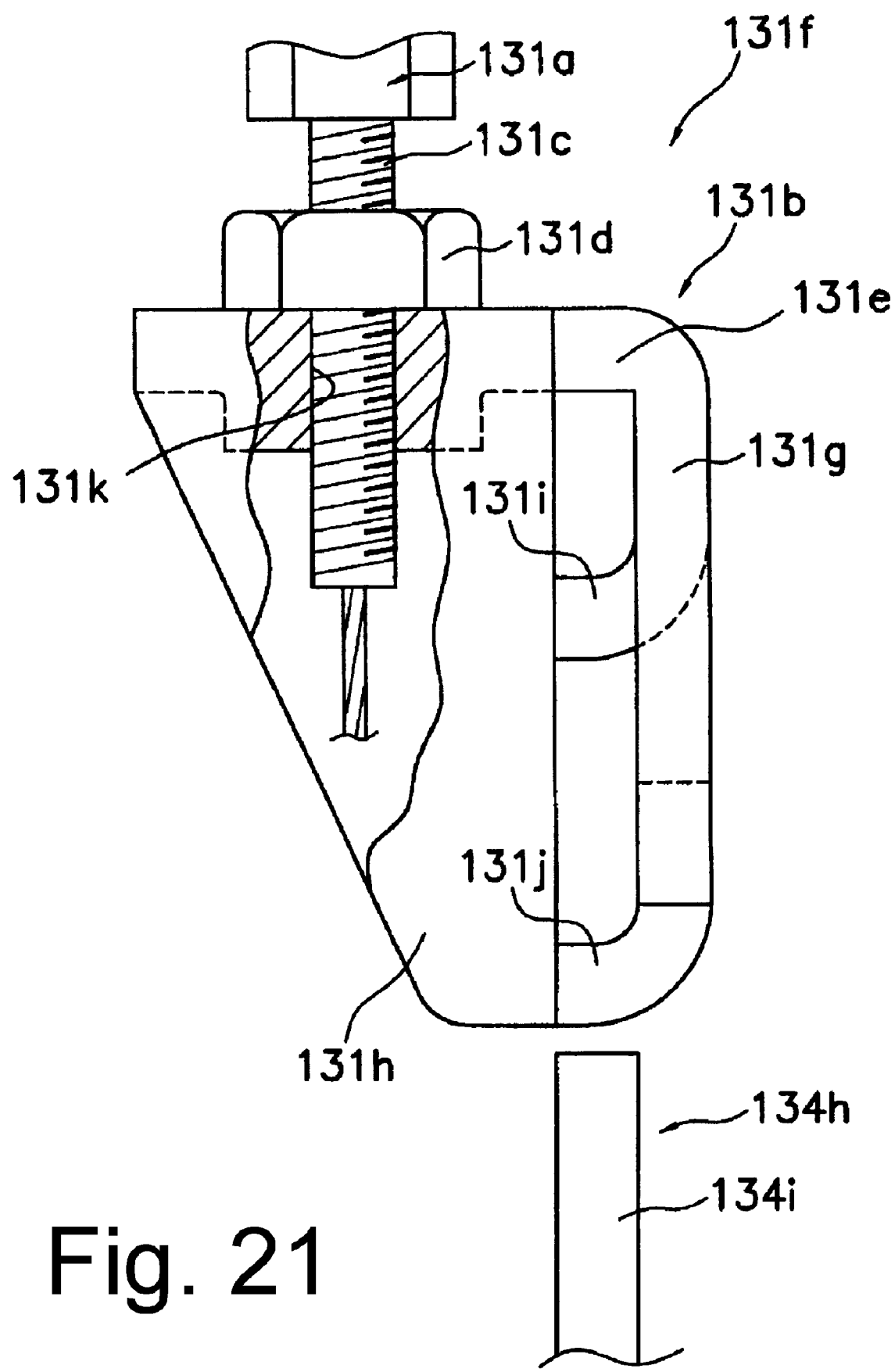
FIG. 21 is a side view of the outer mounting portion.

As shown in FIGS. 20 and 21, outer mounting bracket 134*h* is integrally formed with arm portion 134*b*. An outer fastening slit 134*i* that extends substantially along the cable axis for mounting the outer mounting portion 131*f* is formed in the center of the upper side of outer mounting bracket 134*h*. The outer mounting portion 131*f* has an outer detaining portion 131*a* and an outer fastening bracket 131*b*. Outer mounting portion 131*f* detains outer cable 17*f* of brake cable 14*f*, and outer fastening bracket 131*b* fastens outer detaining portion 131*a* such that the detained position of outer detaining portion 131*a* is adjustable in the cable axial direction. Outer fastening bracket 131*b* detains outer mounting portion 131*f* detachably and nonrotatably on outer mounting bracket 134*h*.

Outer detaining portion 131*a* has a tubular rod configuration for receiving inner cable 16*f* therethrough. A male thread portion 131*c* is formed on the outer periphery of outer detaining portion 131*a* for screwing onto the outer fastening bracket 131*b*. The position of this outer detaining portion 131*a* along the cable axis may be adjusted by the screwing position of the outer detaining portion 131*a* relative to the outer fastening bracket 131*b*. The outer detaining portion 131*a* is held in position on outer fastening bracket 131*b* by means of a lock nut 131*d* that threads onto male thread portion 131*c*.

Bending a metal plate, for example, may form outer fastening bracket 131*b*. Outer fastening bracket 131*b* has a mounting portion 131*e* having the outer detaining portion 131*a* screwed thereto, a back wall portion 131*g* that bends downward in FIG. 20 from one side of mounting portion 131*e*, and side wall portions 131*h* that bend down from both edges of mounting portion 131*e*.

Mounting portion 131*e* has formed therein a female thread portion 131*k* (FIG. 21) into which outer detaining portion 131*a* is screwed. Back wall portion 131*g* has formed thereon two projecting portions 131*i* and 131*j* detained in outer fastening slit 134*i*. Bending the medial section of back wall portion 131*g* produces projecting portion 131*i*, and bending the lower end of back wall portion 131*g* produces projecting portion 131*j*. The width of these projecting portions 131*i*, 131 is slightly smaller than the width of outer fastening slit 134*i* so as to fit inside outer fastening slit 134*i*.

Side wall portions 131*h* are produced by bending, leaving gaps equal to the thickness of back wall portion 131*g* and outer mounting bracket 134*h*. Outer mounting bracket 134*h* thus slides between the back edges of side wall portions 131*h* (the right edge in FIG. 21) and the back wall portion 131*g*. The outer fastening bracket 131*b* is fastened by sliding it over outer mounting bracket 134*h*, and the outer fastening bracket 131*b* is nonrotatably positioned by means of projecting portions 131*i*, 131*j* fitting into outer fastening slit 134.

With an outer mounting portion 131*f* of this design, outer cable 17*f* can be removed by detaching outer fastening bracket 131*b* from outer mounting bracket 134*f*. This outer fastening bracket 131*b* is a larger component than conventional outer fastening portions, so it is easier to attach or detach with one hand, and the outer cable 17*f* is more easily attached and detached as well. Also, since outer detaining portion 131*a* is nonrotatably detained with respect to outer mounting bracket 134*h*, outer detaining portion 131*a* does not rotate during mounting or riding. Thus, the outer cable attaching/detaching operation when attaching or detaching the wheel can be performed with ease, and the outer cable 17*f* is securely fastened.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for actuating a bicycle hub brake, wherein the bicycle hub brake includes a fastening bracket adapted to be nonrotatably mounted relative to a bicycle frame, a brake drum, and a brake mechanism adapted to apply a braking force to the brake drum, wherein the brake drum rotates integrally with a bicycle hub body around a hub axle, wherein the apparatus comprises:
    an actuating member structured to be movably mounted relative to the fastening bracket for actuating the brake mechanism;
    a rotating member structured to be rotatably mounted relative to the fastening bracket independently of the actuating member;
    wherein the rotating member includes an axle opening dimensioned to receive a bicycle hub axle therethrough so that the rotating member rotates around the hub axle;
    wherein the rotating member includes an actuating member moving unit for moving the actuating member; and
    wherein the rotating member has a cable winding surface to wind a brake actuating cable thereon.

2. The apparatus according to claim 1 wherein the rotating member has a disk shape.

3. The apparatus according to claim 1 wherein the cable winding surface comprises a cable winding groove.

4. The apparatus according to claim 1 wherein the rotating member includes a brake control element mount.

5. The apparatus according to claim 4 wherein the brake control element mount comprises an opening in the rotating member.

6. The apparatus according to claim 4 wherein the actuating member moving unit extends from a side surface of the rotating member.

7. The apparatus according to claim 6 wherein the actuating member moving unit comprises a first projection that extends from a side surface of the rotating member and is dimensioned to move the actuating member.

8. The apparatus according to claim 7 wherein the actuating member rotates to actuate the brake mechanism.

9. The apparatus according to claim 7 wherein the actuating member moving unit comprises a second projection that extends from the side surface of the rotating member and is dimensioned to move the actuating member.

10. The apparatus according to claim 9 wherein the first projection moves the actuating member in a first direction, and wherein the second projection moves the actuating member in a different second direction.

11. The apparatus according to claim 10 wherein the actuating member rotates to actuate the brake mechanism.

12. The apparatus according to claim 1 wherein the actuating member comprises an actuating arm with an axle opening dimensioned to receive a bicycle hub axle therethrough so that the actuating arm rotates around the hub axle.

13. The apparatus according to claim 12 wherein the actuating member moving unit comprises first and second projections disposed on opposite sides of the actuating member.

14. An apparatus for actuating a bicycle hub brake, wherein the bicycle hub brake includes a brake drum and a brake mechanism adapted to apply a braking force to the brake drum, wherein the brake drum rotates integrally with a bicycle hub body around a hub axle, wherein the apparatus comprises:
- a fastening bracket adapted to be nonrotatably mounted relative to a bicycle frame and having an opening dimensioned to receive a hub axle therethrough;
- an actuating member structured to be movably mounted relative to the fastening bracket for actuating the brake mechanism;
- a rotating member structured to be rotatably mounted relative to the fastening bracket, wherein the rotating member has an opening dimensioned to receive the hub axle therethrough;
- wherein the rotating member includes an actuating member moving unit for moving the actuating member; and
- wherein the rotating member has a cable winding surface to wind a brake actuating cable thereon.

15. The apparatus according to claim 14 wherein the cable winding surface comprises a cable winding groove.

16. The apparatus according to claim 14 wherein the actuating member moving unit extends from a side surface of the rotating member.

17. The apparatus according to claim 16 wherein the rotating member has a disk shape.

18. The apparatus according to claim 17 wherein the actuating member comprises an actuating arm with an opening dimensioned to receive the hub axle therethrough.

19. The apparatus according to claim 17 wherein the actuating member moving unit comprises first and second projections disposed on opposite sides of the actuating arm.

* * * * *